United States Patent [19]

Akamatsu

[11] Patent Number: 4,934,928

[45] Date of Patent: Jun. 19, 1990

[54] ROTATING-DRUM HEAT TREATMENT APPARATUS

[75] Inventor: Hirokazu Akamatsu, Yokkaichi, Japan

[73] Assignee: Ryoka Techono Engineering & Construction Co., Tokyo, Japan

[21] Appl. No.: 359,216

[22] Filed: May 31, 1989

[51] Int. Cl.⁵ .......................... F28D 11/02; B29F 3/08
[52] U.S. Cl. ......................................... 432/59; 432/11; 165/89; 425/373
[58] Field of Search ................... 34/116, 117, 119, 36, 34/37; 432/103, 105, 107, 112, 114, 59, 77, 83, 81; 165/65, 89, 90; 425/371, 373

[56] References Cited

U.S. PATENT DOCUMENTS

| | | | |
|---|---|---|---|
| 3,762,181 | 10/1973 | Leidig | 165/89 |
| 4,155,786 | 5/1979 | Corbic | 432/59 |
| 4,361,456 | 11/1982 | Reschke | 425/373 |
| 4,457,683 | 7/1984 | Gerhardt et al. | 425/373 |
| 4,486,172 | 12/1984 | Dunning | 432/11 |
| 4,734,229 | 3/1988 | Johnson et al. | 165/89 |

*Primary Examiner*—Henry A. Bennet
*Assistant Examiner*—C. Kilner
*Attorney, Agent, or Firm*—Oblon, Spivak, McClelland, Maier & Neustadt

[57] ABSTRACT

A rotating-drum heat treatment apparatus for carrying out cooling or heating of a material to a desired temperature. The apparatus includes two drums arranged in a casing adjacent to each other for continuously cooling or heating the material to be heat-treated, to thereby increase a time required for the heat treatment of the material.

10 Claims, 1 Drawing Sheet

ROTATING-DRUM HEAT TREATMENT APPARATUS

BACKGROUND OF THE INVENTION

1. Field of the Invention

This invention relates to a heat treatment apparatus, and more particularly to an apparatus for heat treating of synthetic resin, fish, meat or the like by pressing the same onto an outside surface of an inside-cooled or heated rotating-drum to form the sheet-like material, which is, in turn, sliced or cut to obtain the chip-like material.

2. Description of the Prior Art

A rotating-drum heat treatment apparatus is known in the art for use in a cooling system of a pulverizer in the manufacture of thermoplastic synthetic resin, thermosetting synthetic resin or the like. FIG. 2 shows an example of the rotating-drum heat treatment apparatus. The apparatus shown in FIG. 2 includes a rotating cylindrical drum 1, a heating or cooling device 2 for the drum 1, a feeder 3 for a material 4 to be treated onto an outside surface of the inside-cooled or heated rotating-drum 1, and an endless belt 5 continuously moving along an outer periphery of the drum 1, while contacting the feed material 4 onto the surface of the drum, for conveyance of the heat treated material 4 to the next station.

In the conventional rotating-drum heat treatment apparatus described above the heat treatment of the material 4 by the inside-cooled or heated drum 1 chiefly depends upon the rotating speed of the drum 1. Accordingly, if the material 4 is subjected to the heat treatment at a higher or lower temperature, the drum 1 must be rotated at a low speed, which results in a decrease in the throughput capacity of the apparatus. This disadvantage could be eliminated if a large drum is used. However, it is not practical to prepare the large drum in view of the manufacturing and the installation problems. Furthermore, a significant increase in the throughput capacity cannot be expected if a large drum is used, because the heat treatment time can be prolonged.

SUMMARY OF THE INVENTION

The present invention has been made in view of the foregoing disadvantage of the prior art.

Accordingly, it is an object of the present invention to provide a rotating-drum heat treatment apparatus which is capable of heat treating of a material in large amounts at a desired temperature.

A rotating-drum heat-treatment apparatus of the present invention comprises a casing, a first cylindrical rotating-drum arranged in the casing with its rotation axis horizontal, a second cylindrical rotating-drum arranged in the casing with its rotation axis horizontal which is spaced apart from the first cylindrical rotating-drum with its rotation axis parallel to that of the first cylindrical rotating-drum, means for introducing a cooling or heating medium into each of the first and second cylindrical rotating-drums so as to cool or heat an outside surface of the first and second rotating-drums, means for feeding a material to be heat-treated onto the outside surface of the first rotating-drum so that the material may be heat-treated on the outside surface of the inside-cooled or heated first and second rotating drums as the drums rotate, and an endless belt continuously moving around outer peripheral surface of the first and second rotating-drums for conveying the material from the first rotating-drum to the second rotating-drum while subjecting the material to contact with the outer surface of the first and second rotating-drums to effect heat transfer therebetween.

In the apparatus of the present invention, the material fed onto the outside surface of the first rotating-drum from the feeder is transported to the second rotating-drum as the first drum rotates while being pressed between the first rotating-drum and the endless belt, during which the material is subjected to heat treatment by the outside surface of the inside-cooled or heated first rotating-drum. When the endless belt is disengaged from the first rotating-drum and then engaged with the second rotating-drum, the material is again pressed between the second rotating-drum and the endless belt, during which the material is subjected to further heat treatment by the outside surface of the inside-cooled or heated second rotating-drum so that the material may be heat-treated at a desired temperature. In the present invention, the overall contacting surface of the drums for subjecting the material to heat treatment is at least dual as compared with the heat treatment apparatus which include a single rotating-drum as shown in FIG. 2. Accordingly, both drums can be rotated at a high speed.

BRIEF DESCRIPTION OF THE DRAWINGS

These and other objects and many of the attendant advantages of the present invention will be readily appreciated as the same becomes better understood by reference to the following detailed description when considered in connection with the accompanying drawings wherein.

DETAILED DESCRIPTION OF THE PREFERRED EMBODIMENT

Now, a rotating-drum heat treatment apparatus according to the present invention will be described with reference to FIG. 1.

Figure 1:
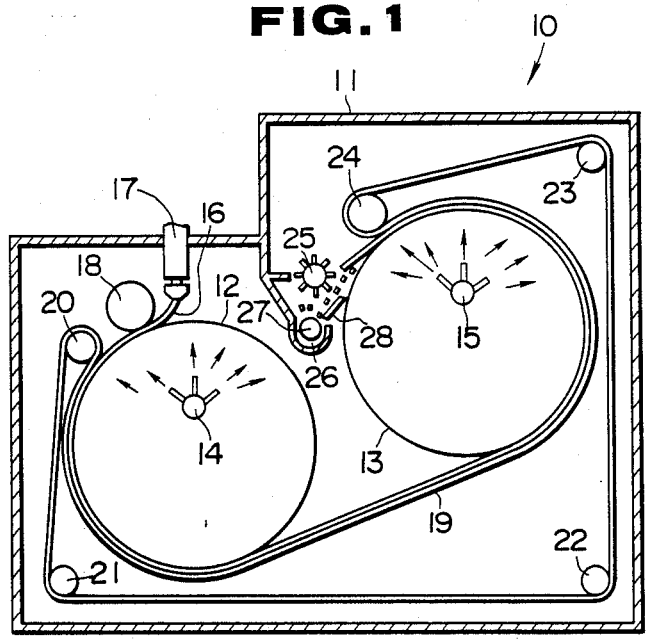
FIG. 1 is a schematic view showing an embodiment of a rotating-drum heat treatment apparatus according to the present invention.
Figure 2:
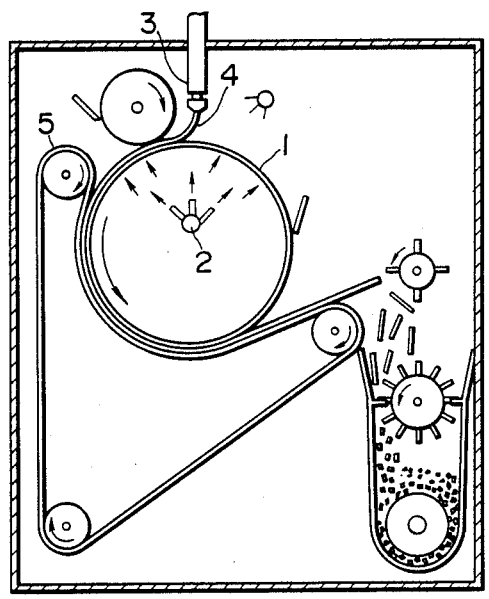
FIG. 2 is a schematic view showing a rotating-drum heat treatment apparatus of prior art.

FIG. 1 shows an embodiment of a rotating-drum heat treatment apparatus according to the present invention which is generally designated by reference numeral 10.

The rotating-drum heat treatment apparatus 10 includes a casing 11 and a first and second rotatable drums 12 and 13 arranged adjacent to each other in the casing 11. The first and second drums 12 and 13 may be of the same diameter or the second drum 13 may be of larger diameter than the first drum 12. Both drums 12 and 13 are provided with inlets 14 and 15 for introducing a cooling or heating medium into each of the drums which is fed from a cooling or heating unit (not shown) so that an outside surface of each of the drums 12 and 13 may be cooled or heated. In order to establish a temperature gradient between the first and second drums 12 and 13, the volume of the cooling or heating medium introduced into each of the first and second drums 12 and 13 is variable depending upon a temperature desired to be obtained on the outside surface of each of the drums 12 and 13. A feeder 17 for feeding a material 16 to be treated onto the outer surface of the drum 12 is arranged above the first drum 12, and a pressure roller 18 is arranged adjacent the outer surface of the first drum 12 and the feeder 17 for applying pressure to the material 16 fed from the feeder 17 onto the outer surface of first drum 12 so that it may be rolled thereon.

An endless belt 19 runs around the first and second drums 12 and 13 to convey the material 16 rolled by the pressure roller 18. The endless belt 19 moves continuously over a drive roller 20 and four guide rollers 21, 22, 23 and 24. The drive roller 20 is so positioned that a portion of the endless belt 19 disposed between the drive roller 20 and the guide roller 24 is contacted onto the surface of the first drum 12 over an angular range of about 140° from a position adjacent to the pressure roller 18. The endless belt 19 extends from the first drum 12 to the second drum 13 on a tangent line parallel to a line defined by connecting centers of the drums 12 and 13 and is wound on the second drum 13 over an angular range of about 190°. Thus, the endless belt 19 is run on the drums 12 and 13 to have the same side, namely, an outer side of the loop, contacted with the outer surfaces of both drums 12 and 13.

The guide roller 24 deflects the endless belt 19 away from the outer surface of the second drum 13 so that it may be apart from the drum 13. The guide roller 24 is disposed at the position slightly deviated offset from a position directly above the second drum 13 to determine the angular range of the endless belt 19 with respect to the second drum 13. Reference numeral 25 designates a rotary cutter which is arranged adjacent to the guide roller 24, and reference numeral 26 designates a receiving channel for collecting the material 16 which is sliced or cut by the rotary cutter 25. In the receiving channel 26, a screw conveyer 27 is arranged for discharging the material after having been processed from the casing 11. The apparatus 10 further includes a scraper 28 for rubbing the material 16 from the drum 13 which remains adhered on the outer peripheral surface of the drum 13 after having been conveyed by the endless belt 19 while being pressed onto the outer peripheral surface of the second drum 13 and released from the endless belt.

Now, the manner of operation of the rotating-drum heat treatment apparatus of the illustrated embodiment will be described hereinafter.

The following description will be made with reference to a cooling system of a pulverizer in the manufacturing of synthetic resin as an example, although the apparatus is not limited to such an use. Thus, the material to be treated by the apparatus 10 is molten synthetic resin.

First, the outside surface of each of the drums 12 and 13 is cooled by introducing a liquid or gaseous cooling medium, such as, water, aqueous ethylene glycol solution, aqueous solution of calcium chloride, fluorohydrocarbon, ammonia or the like, into the inside of the drum through the inlets 14 and 15. Then, a molten resin material 16 is supplied from the feeder 17 onto the outer surface of the drum 12. The material is carried on the rotating-drum 12 and rolled by the pressure roller 18 so as to have the thickness even and to produce uniform cooling. The material is then conveyed while being in contact with the first drum 12 pressed by the endless belt 19, during which the molten resin material 16 is subjected to cooling by the first drum 12.

Then, the material 16 is released from contact with the first drum 12 guided by the endless belt 19 and then shifted to the second drum 13 while being carried on the endless belt 19. This causes the material 16 to be in contact with the outside surface of the second drum 13 pressed by the endless belt 19, during which the material 16 is further subjected to cool and hardened to a solid state. Then, the solid resin material 16 is released from the endless belt at the position where the endless belt 19 is apart from the second drum 13, and then finely sliced or cut by the cutter 25 and collected in the receiving channel 26. The resin material after being processed is discharged from the casing 11 by the screw conveyer 27.

In order to facilitate separation of the resin material 16 from the endless belt 19, the endless belt 19 is preferably made of tetrafluoroethylene, which is prepared by laminating tetrafluoroethylene on a knitted sheet-like support made of glass fiber to have the total thickness of about 0.5 to 7 mm.

The resin material 16 carried on the endless belt 19 often slips off or breaks off if there is a difference in rotational speed between both drums 12 and 13. In order to avoid such a problem, a drive mechanism for driving the endless belt 19 through the drive roller 20 is so controlled that the traveling speed of the belt 19 may be synchronized with that of the resin carried on the drums 12 and 13.

Operation of the rotating-drum heat treatment apparatus 10 has been explained hereinabove with reference to the manufacture of synthetic resin. However, it is to be understood that the apparatus of the present invention may be effectively applied to heat treatment of a ground fish or meat, or the like. In such an application, a suitable heating medium, such as, hot water, steam, dowtherm oil, SK oil, mineral oil, silicone oil, molten salt or the like may be introduced through the inlets 14 and 15 into the drums 12 and 13. The apparatus may be operated at positive pressure, atmospheric pressure, or at a partial or full vacuum. The gas within the casing 11 may be atmosphere or may be same other gas or gas mixture to prevent deterioration of the material to be treated, such as $N_2O$ or an inert atmosphere ($N_2$).

As can be seen from the foregoing, the rotating-drum heat treatment apparatus of the present invention is so constructed that the material to be treated is subjected to the heat treatment continuously by means of two drums. Accordingly, cooling or heating of the material is carried out for a sufficient period of time, and the material is effectively cooled or heated at a desired temperature while rotating the drums at a high speed. Thus, the throughput capacity of the apparatus can be significantly increased.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed as new and desired to be secured by Letters Patent of the United States is:

1. A rotating-drum heat treatment apparatus comprising:
   a casing;
   a first cylindrical rotating-drum arranged in said casting with its rotational axis horizontal;
   a second cylindrical rotating-drum arranged in said casing with its rotation axis horizontal, said second cylindrical rotating-drum being spaced apart from said first cylindrical rotating-drum with its rotational axis parallel to that of said first cylindrical rotating-drum;

means for introducing a medium into each of said first and second cylindrical rotating-drums so as to modify the temperature of an outside surface of said first and second rotating-drums;

means for feeding a material to be heat-treated onto said outside surface of said first rotating-drum, said material being heat-treated on said outside surface of said first and second rotating drums as said drums rotate; and belt means continuously moving around an outer peripheral surface of said first and second rotating-drums for conveying said material from said first rotating-drum to said second rotating-drum while subjecting said material, while maintaining said material between said belt means and said first and second rotating drums, respectively, to effect heat transfer; and means positioned between said first and second rotating drums for discharging said material after said heat transfer.

2. The rotating-drum treatment as defined in claim 1, which comprises a drive roller and a plurality of guide rollers wherein said belt means moves over said drive roller and said guide rollers and means for rotating said rollers synchronously with said first and second rotating-drums.

3. The rotating-drum heat treatment apparatus as defined in claim 2, wherein said drive roller and said guide rollers are so positioned around said first and second rotating-drums that said endless belt is wound on said first rotating-drum over an angular range of about 140° and said second rotating-drum over an angular range of about 190°.

4. The rotating-drum heat treatment apparatus as defined in claim 1, wherein said belt means is made of tetrafluoroethylene laminated on a sheet of glass fiber.

5. The rotating-drum heat treatment apparatus as defined in claim 1, wherein said second rotating-drum is of a larger diameter than said first rotating-drum.

6. The rotating-drum heat treatment apparatus as defined in claim 1, wherein said medium introduced into said second rotating-drum comprises a cooling medium for permitting said outside surface of said second rotating-drum to maintain a temperature lower than that of said outside surface of said first rotating-drum.

7. The rotating-drum heat treatment apparatus as defined in claim 1, wherein said medium introduced into said second rotating-drum comprises a heating medium for permitting said outside surface of said second rotating-drum to maintain a temperature higher than that of said outside surface of said first rotating-drum.

8. The rotating-drum heat treatment apparatus as defined n claim 1, wherein said casing comprise means for maintaining a nitrogen gas atmosphere to prevent deterioration of said material to be treated.

9. The rotating-drum heat treatment apparatus as defined in claim 1 further comprising a pressure roller for applying pressure to said material fed from said feeding means onto said outside surface of said first rotating drum so that it may be rolled thereon.

10. The rotating-drum heat treatment apparatus as defined in claim 9 further comprising a rotary cutter for slicing or cutting said material after having been heat-treated by means of said inside-cooled or heated said first and second rotating-drums.

* * * * *